United States Patent [19]

Sato et al.

[11] Patent Number: 5,690,573
[45] Date of Patent: Nov. 25, 1997

[54] APPARATUS FOR ASSEMBLING BELT OF VARIATOR

[75] Inventors: Yutaka Sato; Wataru Takada, both of Saitama-ken, Japan

[73] Assignee: Honda Giken Kogyo Kabushiki Kaisha, Tokyo, Japan

[21] Appl. No.: 595,190

[22] Filed: Feb. 1, 1996

[30] Foreign Application Priority Data

Feb. 15, 1995 [JP] Japan ................................. 7-026713

[51] Int. Cl.$^6$ ................................................ B23P 19/00
[52] U.S. Cl. ....................... 474/273; 29/822; 29/809; 29/789; 29/787; 29/771
[58] Field of Search .................... 474/1, 12, 28, 474/29, 30, 31, 273; 29/771, 787, 789, 809, 822

[56] References Cited

U.S. PATENT DOCUMENTS 4,793,057  12/1988  Kamiyama ................. 79/822

FOREIGN PATENT DOCUMENTS 7-24671  1/1995  Japan .
7-74605  8/1995  Japan .

Primary Examiner—David J. Bagnell
Assistant Examiner—Tony Boyd
Attorney, Agent, or Firm—Armstrong, Westerman, Hattori, McLeland & Naughton

[57] ABSTRACT

A belt of a variator is automatically assembled into a pair of pulleys. The pulleys are held by a pulley holding unit which has a pair of holding members for holding the pulleys such that axial lines of the pulleys become parallel to each other. The pulleys are arranged to be relatively moved such that a sheave half of each of the pulleys is brought into a groove of the other of the pulleys. A belt feeding unit feeds the belt. A belt assembly head pinches the belt to be fed from the belt feeding unit for extending it across the pair of pulleys. The belt assembly head has belt pinching devices and an arrangement for moving the belt pinching devices which pinch an intermediate portion of one side of the belt and an intermediate portion of the other side of the belt. By operating the pinching devices such that one longitudinal end of the belt becomes narrower or larger, one end and the other end of the belt are sequentially assembled into one and the other of the pair of pulleys which are held in a condition in which the sheave half of each of the pulleys is brought into the groove of the other of the pulleys.

9 Claims, 8 Drawing Sheets

APPARATUS FOR ASSEMBLING BELT OF VARIATOR

BACKGROUND OF THE INVENTION

1. Field of the Invention

The present invention relates to an apparatus for extending a belt across (or assembling a belt into) a pair of pulleys in a variator (or a continuously variable transmission).

2. Description of the Related Art

A pulley of a variator is provided with a fixed or stationary sheave half member (or simply called "a sheave half") and a movable sheave half. By varying the groove width through the movement of the movable sheave half, the diameter of winding the belt is changed to thereby effect a continuous or stepless speed changing.

The belt for the variator is arranged to be extended across a pair of pulleys on the driving side and on the driven side, respectively, without giving rise to slackening or loosening thereof. Further, both the pulleys are disposed as close to each other as possible to make the variator compact in size. It is therefore difficult to extend the belt across both the pulleys after both the pulleys have been assembled.

As a solution, the following method is conventionally employed. Namely, in the steps of assembling the pair of pulleys, the stationary sheave halves of both the pulleys are set in position at a predetermined distance therebetween. Then, both end portions of the belt are placed on the stationary sheave halves of both the pulleys. The movable sheave halves of the respective pulleys are assembled such that the end portions of the belt are pinched against the stationary sheave halves of the respective pulleys. In this manner, the assembling of the pulleys and the belt is carried out at the same time.

In the above-described conventional art, since the assembling of the belt is made in the steps of assembling the pulleys, there is a disadvantage in that the assembling steps of the pulleys become complicated.

By the way, in the Japanese Published Unexamined Patent Application No. 24671/1995 there is known a method for assembling the belt by using a pulley holding unit after the pulleys have been assembled. The pulley holding unit comprises a pair of holding members for holding a pair of pulleys such that axial lines of the pulleys become parallel to each other, and a means for relatively moving both the holding members such that a sheave half of each of the pulleys is brought into a pulley groove of the other of the pulleys.

SUMMARY OF THE INVENTION

While the conventional method is for manually assembling a belt, the present invention has an object of providing an apparatus in which the belt is automatically assembled after the pulleys have been assembled, by using the above-described pulley holding unit.

In order to attain the above object, the present invention is an apparatus for assembling a belt of a variator, wherein the belt is automatically assembled into a pair of pulleys held by a pulley holding unit having a pair of holding members for holding the pulleys such that axial lines of the pulleys become parallel to each other, and means for relatively moving the holding members such that a sheave half of each of the pulleys is brought into a groove of the other of the pulleys, the apparatus comprising: a belt feeding unit for feeding the belt; and a belt assembly head for pinching the belt to be fed from the belt feeding unit and extending the belt across the pair of pulleys, the belt assembly head comprising belt pinching means, and movement imparting means for moving the belt pinching means such that one end and the other end of the belt are sequentially assembled into one and the other of the pair of pulleys which are held in a condition in which the sheave half of each of the pulleys is brought into the groove of the other of the pulleys.

By the movement of the pair of holding members of the pulley holding unit, the sheave half of each of the pulleys is brought into the groove of the other of the pulleys. The distance between the axes of the pair of pulleys can thus be narrowed. Accordingly, by the movement of the belt pinching means of the belt assembly head, one end portion of the belt can first be mounted or assembled onto one of the pulleys and then pulled diametrically inwards of the pulley. The other end portion of the belt will be permitted to be assembled onto the other of the pulleys.

If the belt feeding unit is made up of lifting means for lifting belts kept in a stacked condition, and serving means for serving and holding an uppermost belt, the belt that is held by the serving means can be pinched by the pinching means of the belt assembly head. The belts can thus be surely fed to the belt assembly head in succession.

As a preferable arrangement of the belt assembly head, the belt pinching means comprises: a pair of pinching devices for pinching an intermediate portion of one side of the belt and an intermediate portion of the other side of the belt; and wherein the movement imparting means comprises: a parallel-movement imparting means for parallelly moving both pinching devices at least in two directions of an axial direction of the pulleys and a direction perpendicular to both axial lines of the pair of pulleys; tilting means for tilting both pinching devices about an axis which is in parallel with a direction in which both the pinching devices lie opposite to each other; and rotating means for respectively rotating both the pinching devices about an axis which is parallel with an axial line of the pulleys to thereby bend the belt such that a distance between one side and the other side of the belt becomes narrower towards one end portion thereof.

It is also preferable that the apparatus further comprises: a movable frame which constitutes the parallel-movement imparting means and which parallelly moves in the axial direction of the pulleys and in the direction perpendicular to both axial lines of the pair of pulleys; and a head frame on which both pinching devices are rotatably mounted via the rotating means; wherein the head frame is pivotally mounted on the movable frame in a tiltable manner via a pivot axis which is parallel with a direction in which both the pinching devices lie opposite to each other, the head frame constituting the tilting means.

As a result of the tilting of both pinching devices by the tilting of the head frame, the belt is tilted so that one end portion thereof approaches one of the pulleys. In this condition, by the movement of the movable frame, both the pinching devices are moved in the axial direction of the pulleys to have that sheave half of one of the pulleys which has not been brought into the pulley groove of the other of the pulleys passed through one end portion of the belt, whereby one end portion of the belt is caused to face the pulley groove of said one of the pulleys. At this time, since the belt is tilted, the other end portion of the belt will not interfere with the other of the pulleys.

Then, by the movement of the movable frame, both the pinching devices are moved towards the other of the pulleys in the direction perpendicular to both axial lines of the pair of pulleys. One end portion of the belt is thus mounted onto said one of the pulleys and is pulled diametrically inwards of the pulley. Also, by rotating both the pinching devices by the rotating means, the distance between both sides of the belt becomes smaller towards one end portion thereof. According to this operation, the length between both end portions of the belt increases and also the radius of curvature at the other end of the belt becomes larger due to its own elastic restoring force. The other end portion of the belt can thus be positioned outside the axial projected area of the other of the pulleys.

Furthermore, one end portion of the belt can be mounted onto one of the pulleys in its free state of a circular shape. In this case, however, after one end portion of the belt has been mounted onto one of the pulleys, the distance between the pinching devices must be narrowed. Otherwise, even if both the pinching devices are rotated, the other end portion of the belt cannot be positioned outside the projected area of the other of the pulleys. It follows that it requires an operation time to narrow the distance between both the pinching devices, resulting in a poor working efficiency. On the contrary, if an arrangement is made such that both pinching devices can be rotated in a direction opposite to the above-described direction by means of the rotating means, the working efficiency can be improved for the following reasons. Namely, even if the distance between both pinching devices is narrowed in advance, said one end portion of the belt can be mounted onto one of the pulleys without much trouble by bending the belt through reverse rotation of both of the pinching devices such that the distance between both sides of the belt is narrowed towards the other end portion thereof, thereby increasing the radius of curvature of said one end portion. It is therefore not necessary to narrow the distance between the pinching devices after having mounted the belt. This results in an improved working efficiency.

If each of the pinching devices comprises an inner pinching piece which abuts an inner side surface of the belt, and an outer pinching piece which abuts an outer side surface of the belt, and if a length, in a longitudinal direction of the belt, of the outer pinching piece is made longer than that of the inner pinching piece, the bent shape of the belt can surely be changed advantageously with a slight force by the rotation of the pinching devices.

As described above, once the other end portion of the belt is positioned outside the axial projection area of the other of the pulleys, both the pinching devices are then moved in the axial direction by the movement of the movable frame. That sheave half of the other of the pulleys which has been brought into the groove of said one of the pulleys is caused to be passed through the other end portion of the belt, whereby the other end portion of the belt is caused to face the groove of the other of the pulleys. Thereafter, the other of the pulleys is moved in a direction to move away from said one of the pulleys to thereby mount the other end portion of the belt onto the other of the pulleys.

By the way, when both pinching devices are moved in the axial direction to face the other end portion of the belt to the Groove of the other of the pulleys, the belt will be tilted in the direction opposite to the above-described tilting direction with one end portion, that has already been mounted onto one of the pulleys, serving as a fulcrum. It is therefore necessary to tilt both the pinching devices to suit this tilting. In this case, it is also possible to tilt both pinching devices by the head frame. However, if the head frame is tilted, both pinching devices move also in the axial direction of the pulleys due to a circular movement of the pinching devices about the pivotal axis of the head frame. It therefore becomes necessary to operate the head frame and the movable frame in a predetermined correlation, resulting in a complicated control. On the contrary, if the head frame is arranged to be tiltable to one direction such that a posture of the belt pinched by both pinching devices becomes a tilted posture in which one end portion of the belt approaches one of the pulleys into which the belt is first assembled, and if both pinching devices are made to be tiltable relative to the head frame against urging means in a direction which is opposite to the tilting direction of both the pinching devices by the tilting to said one direction of the head frame, the pinching devices automatically tilt by following the tilting of the belt. It is therefore advantageous in that no particular control becomes necessary.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 12:
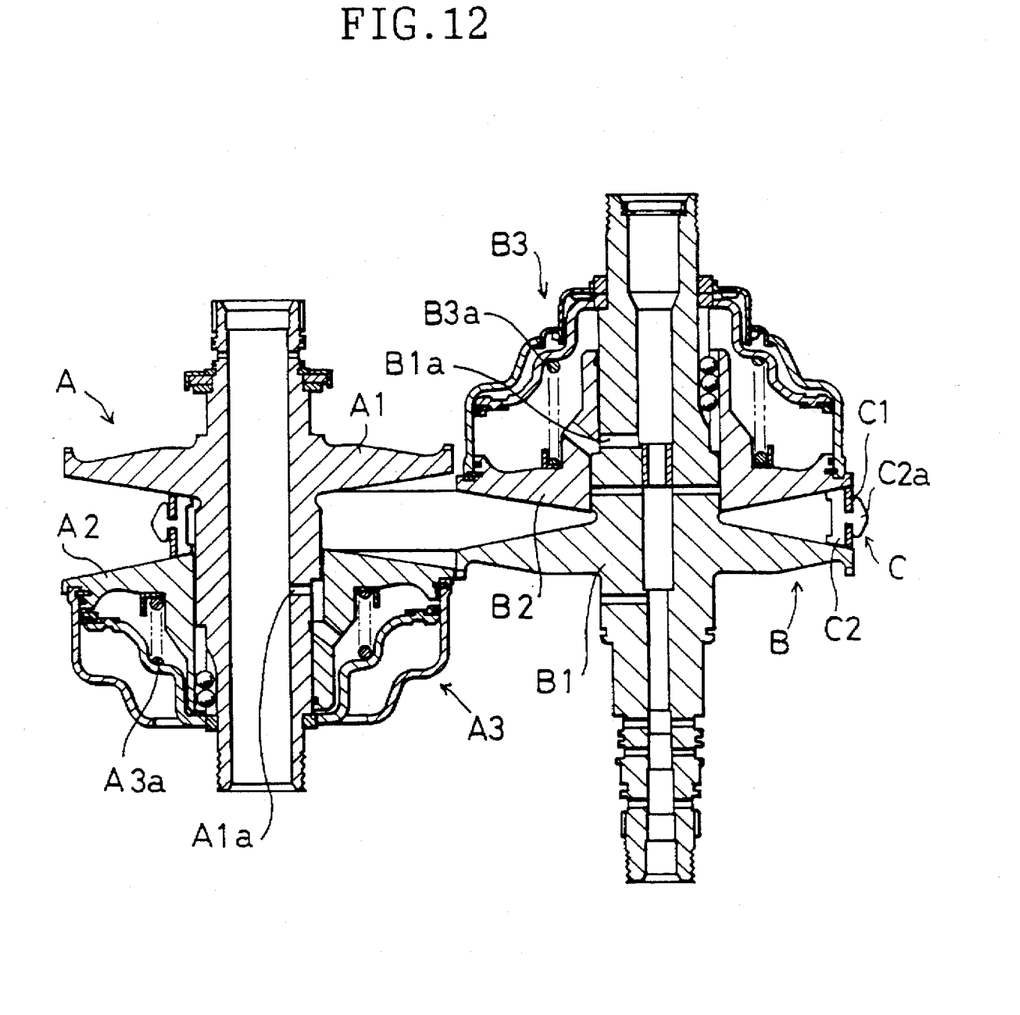
FIG. 12 is a sectional view of a pair of pulleys of a variator.

In the illustrated embodiment the present invention is applied to a belt assembly apparatus for extending a belt C across (or assembling a belt C onto) a drive pulley A and a driven pulley B of a variator as shown in FIG. 12.

Each of the pulleys A, B is made up of a stationary sheave half member (or simply called "a sheave half") A1, B1, a movable sheave half A2, B2 which is slidably fitted onto an axis portion of the stationary sheave half, and a hydraulic actuator A3, B3 which is connected to the movable sheave half. The movable sheave half A2, B2 is pushed or urged to the side of the stationary sheave half A1, B1 by a spring A3a, B3a which is contained inside the hydraulic actuator A3, B3, and by a hydraulic pressure to be inputted to the hydraulic actuator A3, B3 via an oil passage A1a, B1a which is formed in the axis portion of the stationary sheave half A1, B1. By changing the hydraulic pressure the diameter of winding the belt on each of the pulleys A, B is varied to thereby effect the stepless speed changing. The belt C is constituted by a pair of endless metallic belts C1, and a large number of approximately V-shaped elements C2 which come into contact with the groove walls of each of the pulleys A1, B1 and which are engaged with the metallic belts C1 at umbrella-like projections C2a on an external side of each of the elements C2. The drive pulley A and the driven pulley B are disposed in parallel with each other as close to each other as possible in a condition in which the hydraulic actuators A3, B3 of both are disposed on opposite sides.

Figure 1:
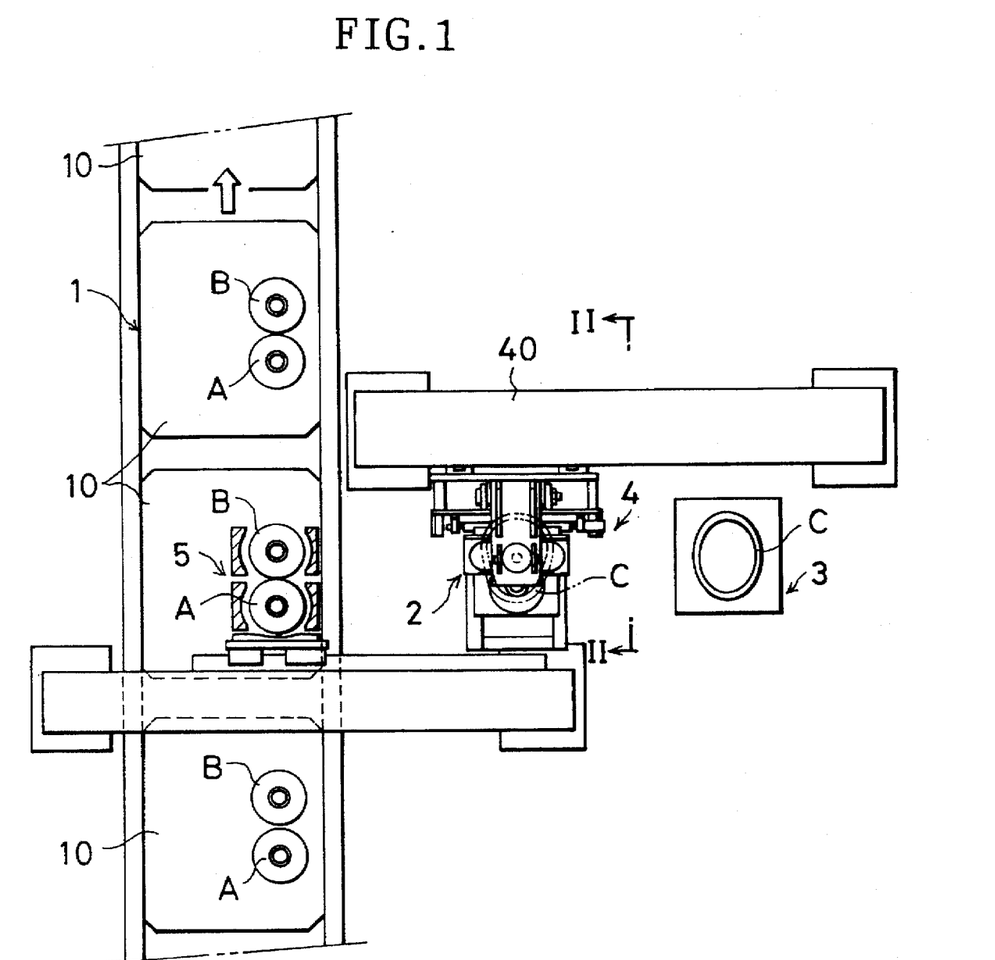
FIG. 1 is a general plan view of one example of an apparatus according to the present invention.

The apparatus for assembling a belt is made up, as shown in FIG. 1, of a pulley holding unit 2 which is provided on a side of a main variator assembly line 1 extending in front and rear directions, a belt feeding unit 3 which is provided on a side of the pulley holding unit 2, and a belt assembly head 4 which can be reciprocated between both the units 2, 3. The assembling of the variator is made in the following manner. Namely, a pair of pulleys A, B on the drive side and the driven side which have been assembled in advance and which are placed on a transporting pallet 10 on the main assembly line 1 are transported by a transfer device 5 to the pulley holding unit 2. After having assembled the belt, both the pulleys A, B are returned by the transfer device 5 to the transporting pallet 10. Necessary works such as the assembling of a casing are carried out in a station on a downstream side of the main varian of assembly line 1.

Figure 2:
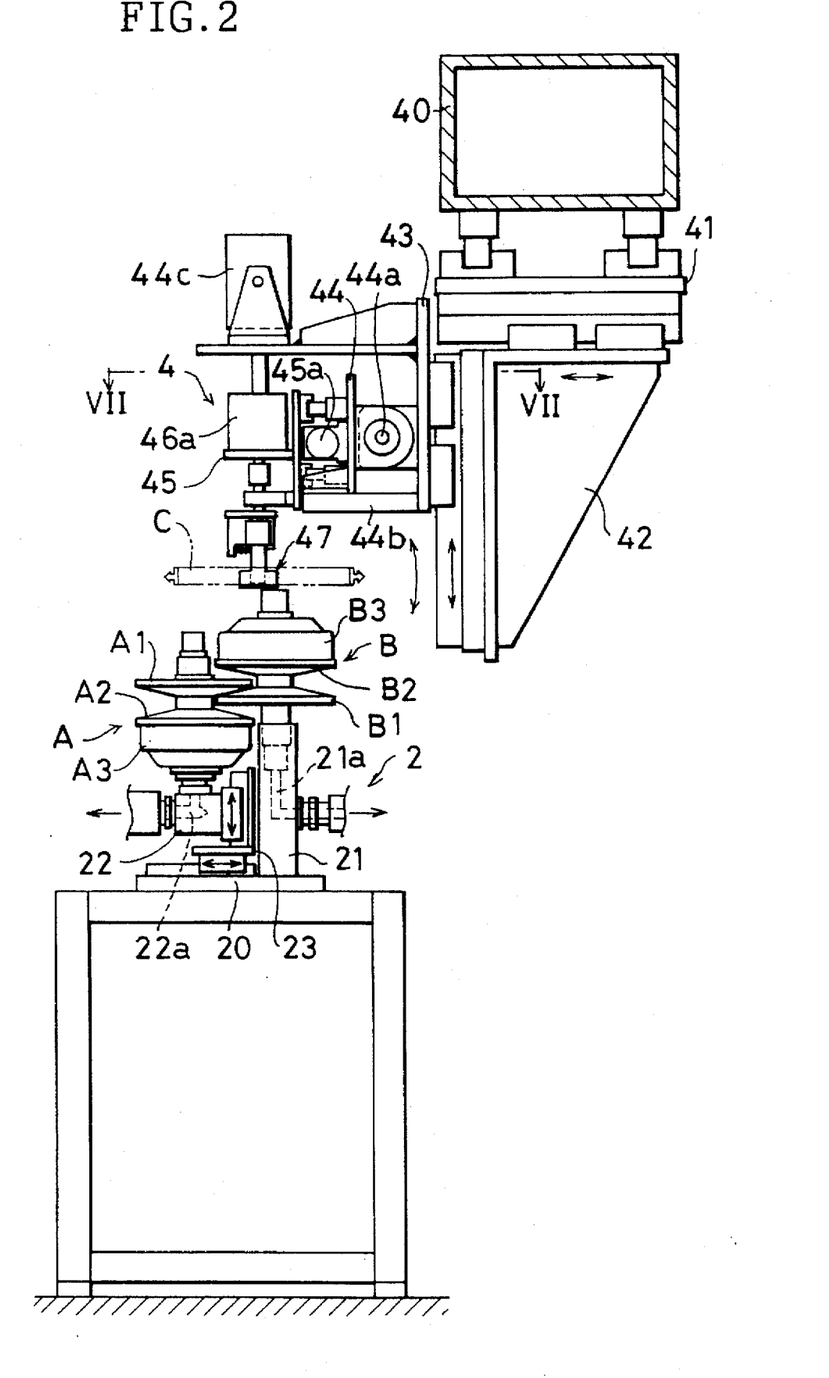
FIG. 2 is an enlarged side view, partly shown in section, taken along the line II—II in FIG. 1.

The pulley holding unit 2 is provided, as shown in FIG. 2, with a pair of front and rear holding members 21, 22 which are disposed in parallel with each other on a base 20. One of the pulleys, e.g., the driven pulley B, is held by the first holding member 21 on the front side in a vertical posture with the hydraulic actuator B3 positioned upward. The drive pulley A is held by the second holding member 22 on the rear side such that an axial line of the drive pulley becomes parallel with the axial line of the driven pulley B, in a vertical posture with the hydraulic actuator A3 positioned downward. The first holding member 21 is fixed to the base 20, but the second holding member 22 is disposed in a manner movable up and down on a movable frame 23 which is provided on the base so as to be movable back and forth. The second holding member 22 is lowered from a condition in which the grooves of both the pulleys A, B are positioned on the same level and then the movable frame 23 is moved forwards. Both the pulleys A, B can thus be held in a condition in which each of the stationary sheave halves A1, B1, which are the half members of each of the pulleys A, B, is brought into the groove of the other of the pulleys. Further, in each of the holding members 21, 22 there is formed an air passage 21a, 22a which is communicated with the oil passage A1a, B1a in each of the pulleys A, B. These air passages 21a, 22a are connected to a negative pressure source (not illustrated). By operating or working a negative pressure on the hydraulic actuator A3, B3 of each of the pulleys A, B, the movable sheave half A2, B2 is moved back against the spring A3a, B3a so that the groove width of each pulley A, B can be widened. The means for widening the groove width is not limited to the above-described type in which the negative pressure source is used, but may also be of a type in which the groove width is mechanically widened.

Figure 3:
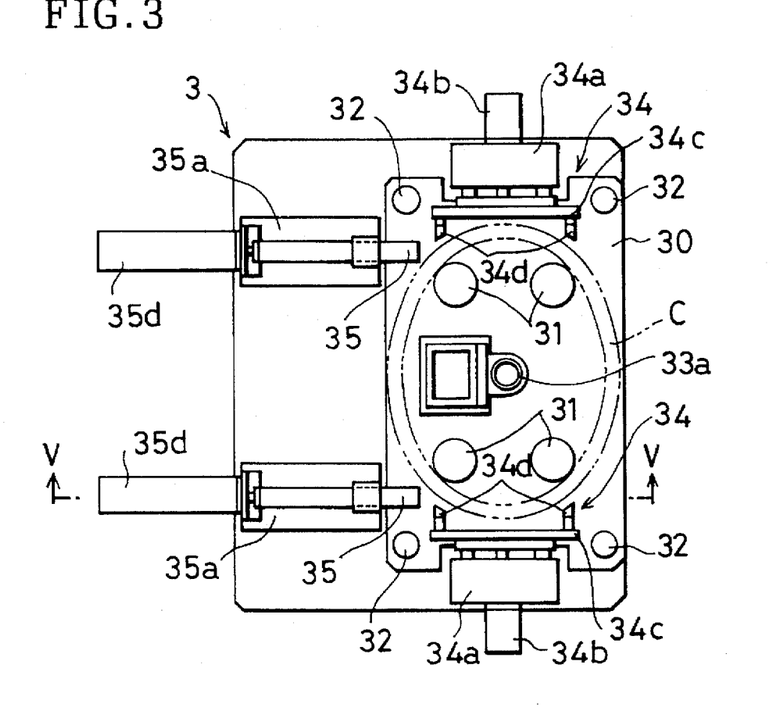
FIG. 3 is an enlarged plan view of a belt feeding unit.
Figure 4:
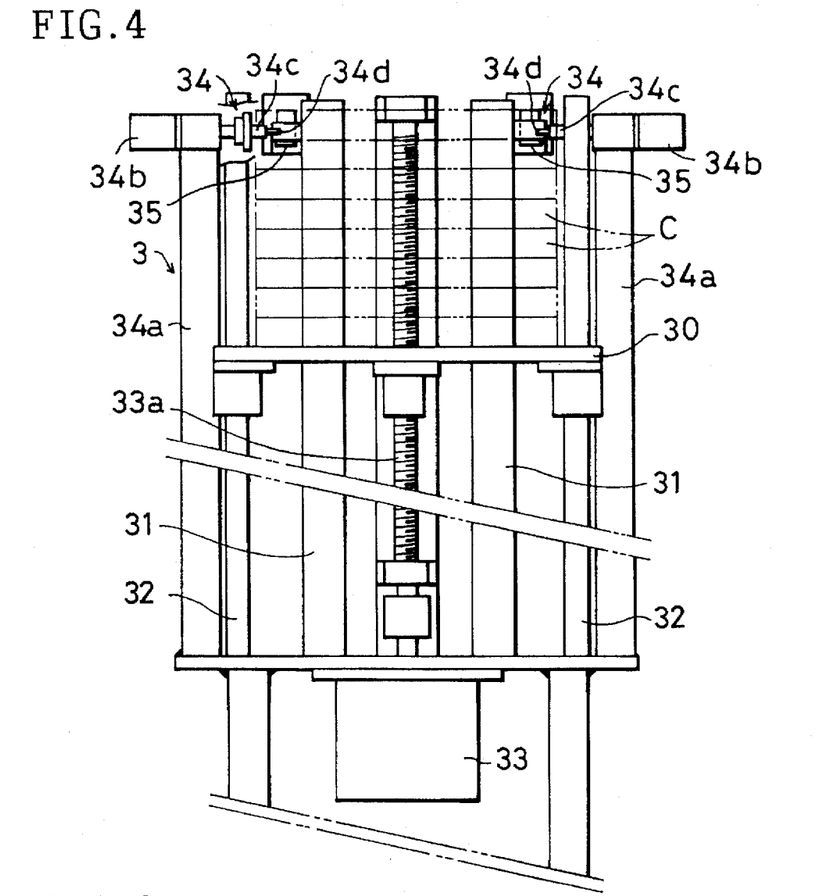
FIG. 4 is a right side view of FIG. 3.
Figure 5:
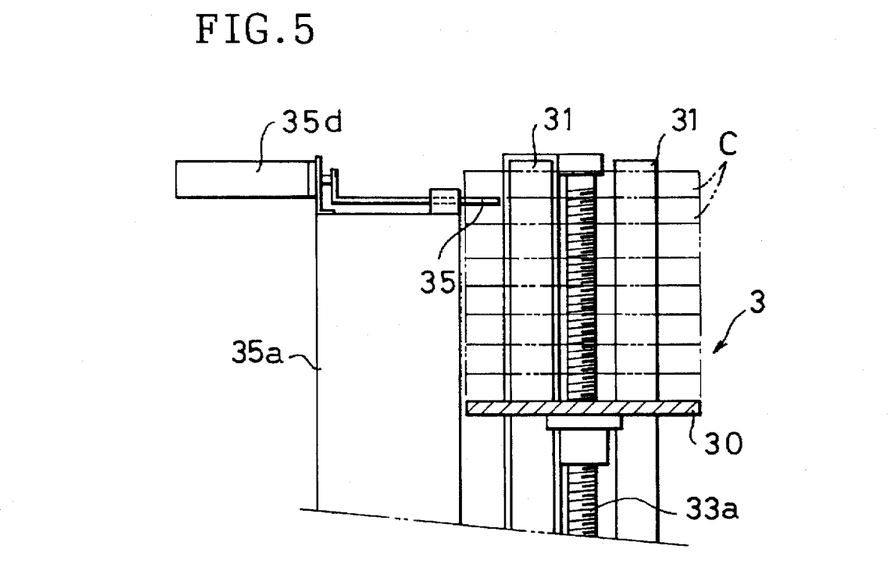
FIG. 5 is a sectional view taken along the line V—V in FIG. 3.

The belt feeding unit 3 is provided, as shown in FIGS. 3 through 5, with a supporting plate 30 for supporting the belts C in a stacked condition, and a pair of right and left in the front and rear, i.e., a total of four guide bars 31 which penetrate through the supporting plate 30 and which hold the belt C in an elliptic shape longitudinal in the back and forth direction by abutting the inner side surface of the belts C. The supporting plate 30 is supported on four corners thereof with four guide rods 32 which are penetrated therethrough so that the supporting plate 30 can be moved up and down.

Figure 6:
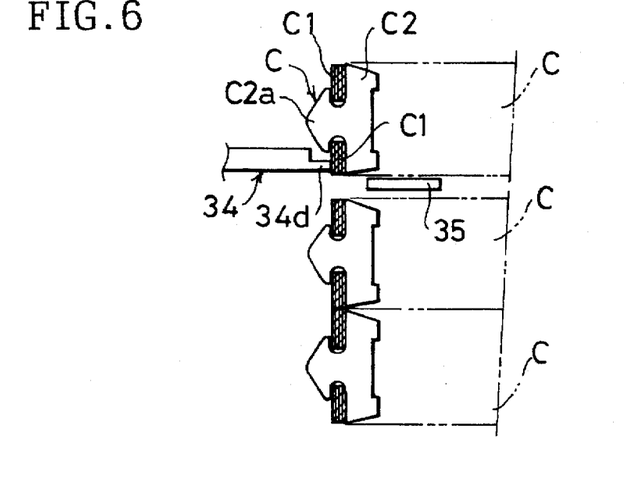
FIG. 6 is an enlarged view of an important portion at the time of feeding a belt.

The supporting plate 30 is arranged to be movable up and down by an electric motor 33 via a threaded bar 33a. The supporting plate 30 and the electric motor 33 constitute a lifting means for lifting the belts C. The belt feeding unit 3 is further provided with a serving means for serving (or picking up) and holding the uppermost belt C. In this embodiment, the serving means is made up of a pair of front and rear belt holders 34 for urgingly holding the uppermost belt C between the belt holders and the guide bars 31, and a pair of front and rear serving pieces (or picking up pieces) 35 which face the lower sides of the front and rear end portions of the uppermost belt C. Each of the belt holders 34 is made up of a supporting column 34a which is vertically provided outside an elevating locus of the supporting plate 30, a movable frame 34c which is provided on an upper end of the supporting column 34a so as to be movable back and forth by a cylinder 34b, and claw pieces 34d which come into abutment, as shown in FIG. 6, with a lower metallic belt C1 of the uppermost belt C and which are provided in a right and left pair so as to be opposite to each of the right and left pair of the guide bars 31. The uppermost belt C is held by the belt holders 34 in an urged manner while preventing the metallic belt C1 from dropping out of position. Each of the serving pieces 35 is disposed on a supporting column 35a which is vertically provided on one side of the locus of elevation of the supporting plate 30 in a manner to be laterally movable by a cylinder 35d. In feeding the belts C, the uppermost belt C is lifted to a predetermined serving position by the lifting of the supporting plate 30. Then, after the uppermost belt C is urgingly held by the belt holders 34, the supporting plate 30 is slightly lowered to thereby set apart the lower belts C from the uppermost belt C. Thereafter, the serving pieces 35 are advanced laterally inwards to prevent the uppermost belt C from dropping out of position. In this condition, the uppermost belt C is pinched by the belt assembly head 4, and then the belt holders 34 and the serving pieces 35 are moved back to thereby transfer the uppermost belt C to the belt assembly head 4.

The belt assembly head 4 is provided, as shown in FIG. 2, with a travelling frame 41 which reciprocates between the pulley holding unit 2 and the belt feeding unit 3 along a guide frame 40 which is provided to extend between both the units 2, 3, a first movable frame 42 which is supported by the travelling frame 41 so as to be movable in the back and forth direction (i.e., in a direction perpendicular to both axial lines of the pair of pulleys A, B), a second movable frame 43 which is supported on the first movable frame 42 so as to be movable up and down (i.e., in the axial direction of the pulleys), and a head frame 44 which is mounted on the second movable frame 43. The head frame 44 is swingably or rotatably supported at its front end portion on the second movable frame 43 via a lateral pivot shaft 44a. The head frame 44 can therefore be inclined clockwise in FIG. 2 by operation of cylinder 44c from a vertical posture to be restrained by arm-like stoppers 44b which are fixed to the second movable frame 43 to an inclined posture by means of cylinder 44c.

Figure 7:
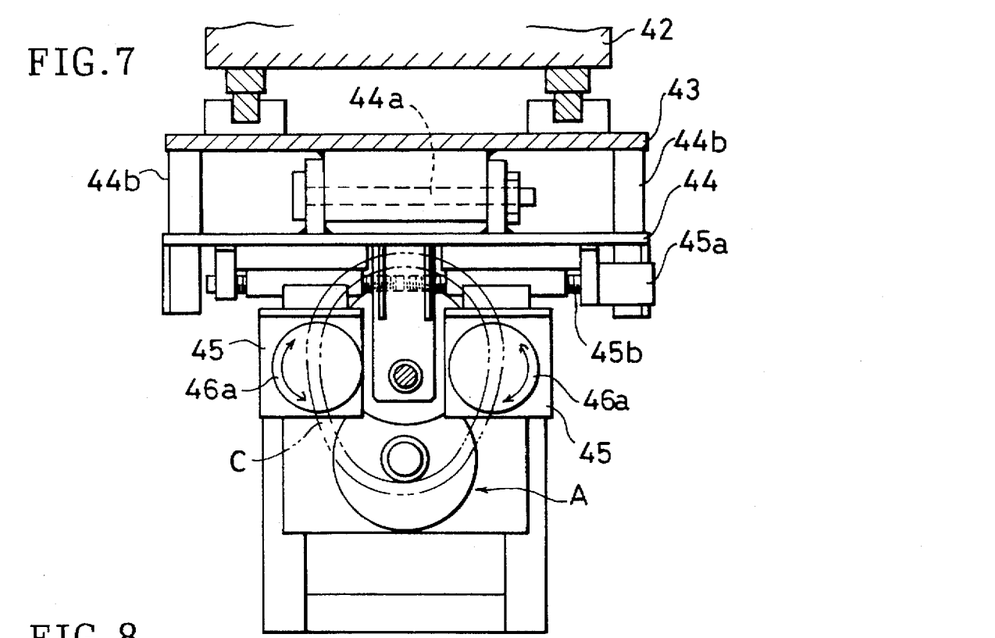
FIG. 7 is an enlarged plan view, partly shown in section, taken along the line VII—VII in FIG. 2.
Figure 8:
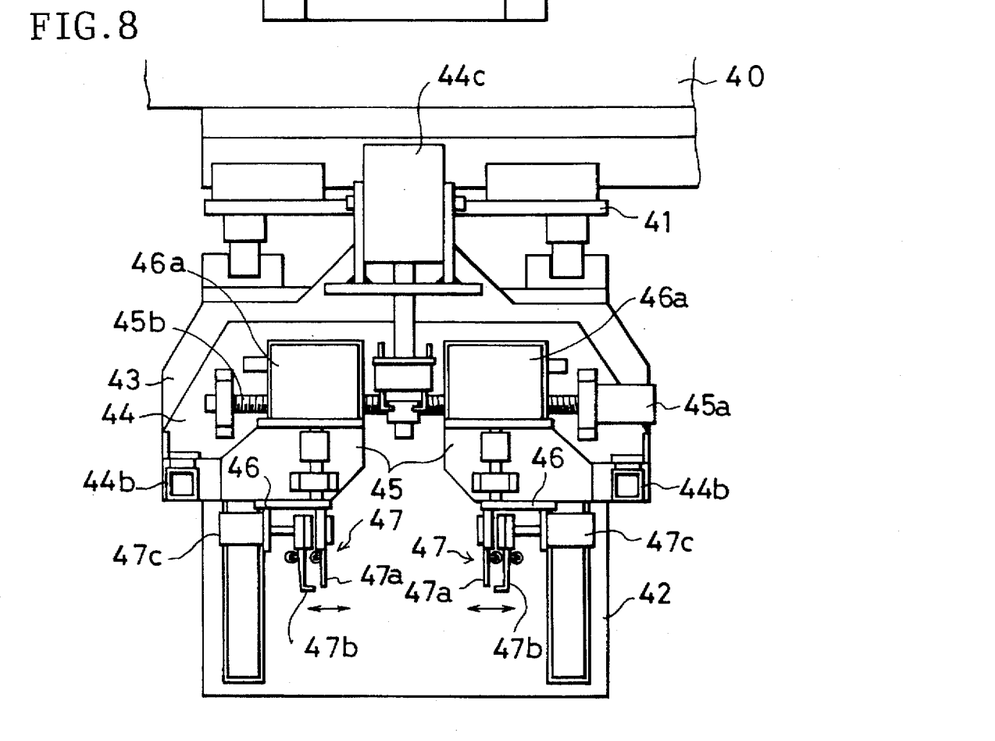
FIG. 8 is a front view of a belt assembly head.

The head frame 44 is provided, as shown in FIGS. 2, 7 and 8, with a pair of slide frames 45, 45 which are horizontally movable. Each of the slide frames 45 is provided with a rotary frame 46 which is rotatable by a rotary actuator 46a about a vertical axial line parallel with the axial line of the pulleys. Each of the rotary frames 46 is provided with a pinching device 47 for pinching an intermediate portion of each right and left side of the belt C. The slide frames 45, 45 are engaged with those threaded portions with opposite thread directions which are formed respectively in the right and left half portions of a threaded bar 45b which is connected to an electric motor 45a. When the electric motor 45a is rotated in one direction or in the opposite direction, both the slide frames 45, 45 are moved synchronously with each other in the laterally inner or outer direction. The distance between the pair of the right and left pinching devices 47, 47 is adjusted to suit the distance between the right and left sides in the intermediate portion of the belt C which is held in an elliptic shape by the belt feeding unit 3. The pinching devices 47, 47 are rotated by the rotation of each rotary frame 46 in one or the opposite direction from a neutral position in which the belt C is held in an elliptic shape to a first rotated position in which the belt C is bent such that the distance between the right and left sides of the belt C becomes narrower towards the rear end portion, and a second rotated position in which the belt C is bent such that the distance between the right and left sides of the belt C becomes narrower towards the front end portion. Though not illustrated, it is desirable to provide a stopper mechanism which cooperates with the rotary frames 46 to thereby position the pinching devices 47 to the above-described respective rotated positions.

Figure 9:
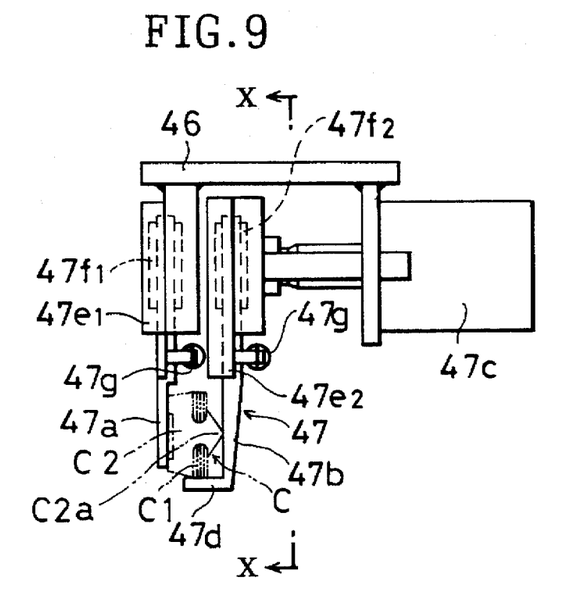
FIG. 9 is an enlarged front view of a pinching device.
Figure 11A:
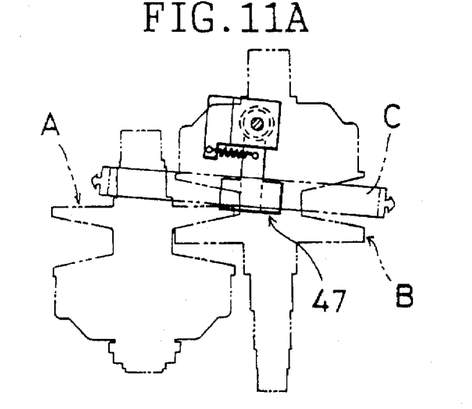
FIGS. 11A through 11D are explanation diagrams showing the assembling procedures of a belt.
Figure 11B:
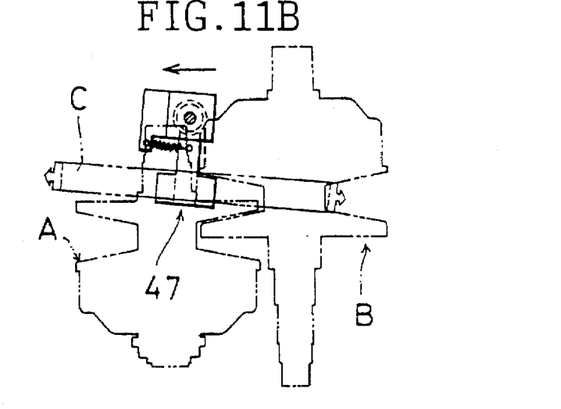

Each of the pinching devices 47 is provided, as shown in FIG. 9, with an inner pinching piece 47a which abuts the inner surface of the belt C and an outer pinching piece 47b which abuts the outer surface of the belt C. The outer pinching piece 47b is urged by a cylinder 47c towards the inner pinching piece 47a to thereby pinch the belt C between both the pinching pieces 47a, 47b. Here, the outer pinching piece 47b is formed, as shown in FIGS. 11A', 11B', such that its length in the longitudinal direction of the belt, i.e., in the front and rear direction, becomes larger than that of the inner pinching piece 47a. According to this arrangement, when each of the pinching devices 47 is rotated to each of the above-described rotated positions, a bending moment is operated on the belt C due to a pushing force from each of front and rear end portions of the outer pinching piece 47b with the inner pinching piece 47a serving as a fulcrum. It is therefore possible to surely deform the belt C with a slight force into the above-described bent shape with a narrower end towards one direction. On the lower end of the outer pinching piece 47b there is formed a hook portion 47d which is bent inwards. By this hook portion 47d the lower metallic belt C1 is prevented from dropping out of position.

Figure 10:
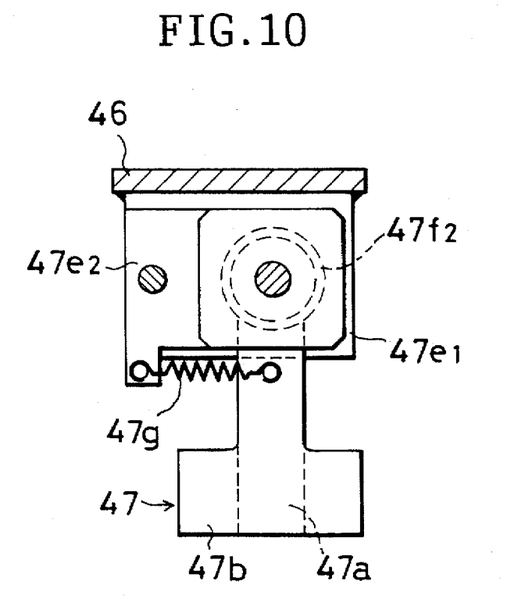
FIG. 10 is a sectional view taken along the line X—X in FIG. 9.

When the head frame 44 is in the vertical posture, the belt C is held in a horizontal posture via the pinching devices 47, 47. When the head frame 44 is tilted or inclined into the tilted posture, the pinching devices 47, 47 are tilted backwards (clockwise in FIG. 10), whereby the belt C is held in a tilted posture with the rear end up. Further, in the present embodiment, the inner pinching piece 47a and the outer pinching piece 47b are rotatably supported, as shown in FIGS. 9 and 10, respectively on supporting portions $47e_1$, $47e_2$ which are respectively fixed to the rotary frame 46 and to a piston rod of the cylinder 47c via thrust bearings $47f_1$, $47f_2$. It is thus so arranged that each of the pinching pieces 47a, 47b can be tilted forwards (counterclockwise in FIG. 10) against a spring 47g which serves as an urging means. The entire pinching device 47 may be arranged to be tiltable forwards against the urging means.

An explanation will now be made about the procedures of assembling the belt C with the apparatus for assembling a belt according to the above-described embodiment.

First, the belt assembly head 4 is returned or moved back to a position right above the belt feeding unit 3. The second movable frame 43 is lowered while the head frame 44 is held in the vertical posture. The intermediate portions of the right and left sides of the uppermost belt C that is held by the serving means of the belt feeding unit 3 are pinched by the pair of pinching devices 47, 47. Then, the second movable frame 43 is elevated to pick up the belt C out of the belt feeding unit 3. Thereafter, the belt assembly head 4 is moved forward to a position right above the pulley holding unit 2. In parallel with this operation, a driven pulley B and a drive pulley A are respectively set in position by the transfer device 5 on the pair of front and rear holding members 21, 22 of the pulley holding unit 2. Then, the groove widths of both the pulleys A, B are widened, and also the stationary sheave half A1, B1 of each of the pulleys A, B is brought into the groove of the other of the pulleys A, B by the movement of the second holding member 22.

Further, before or after the belt assembly head 4 is moved forward towards the pulley holding member 2, the head frame 44 is tilted so that the belt C becomes a tilted posture with the forward side down. Also both the pinching devices 47, 47 are rotated to the first rotated position to thereby deform the belt C to a bent shape with the rear end thereof (i.e., the side of the drive pulley A) becoming narrower. According to this operation, the radius of curvature of the front end portion (i.e., the side of the driven pulley B) of the belt C becomes larger due to its elastic restoration force. As shown in FIG. 11A', the front end portion of the belt C can be protruded outside an area to be formed by projection of the driven pulley B in the axial direction (also called "an area of axial projection of the driven pulley B").

Thereafter, the second movable frame 43 is lowered to have the hydraulic actuator B3 and the movable sheave half B2 of the driven pulley B passed through the front end portion of the belt C. The front end portion of the belt C is thus caused to face the groove of the driven pulley B as shown in FIG. 11A. At this time, since the belt C is tilted with the forward end down, the intermediate portion or the rear end of the belt C will not interfere with the driven pulley B or the drive pulley A.

Thereafter, the first movable frame 42 is moved backwards and the front end of the belt C is pulled radially inwards into the groove of the driven pulley B. At this time, the pinching devices 47, 47 are rotated to the second rotated position to deform the belt C into a bent shape with the front end portion becoming narrower. According to this operation, the rear end portion of the belt C is protruded outside the area of axial projection of the drive pulley A as shown in FIG. 11B'.

Figure 11C:
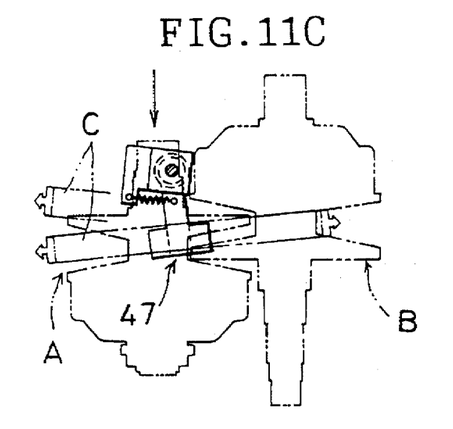

Then, the second movable frame 42 is lowered to have the stationary sheave half A1 of the drive pulley A passed through the rear end portion of the belt C, whereby the rear end portion of the belt C is caused to face the groove of the drive pulley A as shown in FIG. 11C. At this time, the belt C is tilted with the rear end down with the front end portion to be engaged with the driven pulley B serving as a fulcrum. In this case, even if the head frame 44 is not tilted so that the rear end is down, the pinching devices 47, 47 are tilted forwards against the springs 47g by following the tilting of the belt C. Therefore, the belt C will not be taken out of position of the pinching devices 47, 47.

Figure 11D:
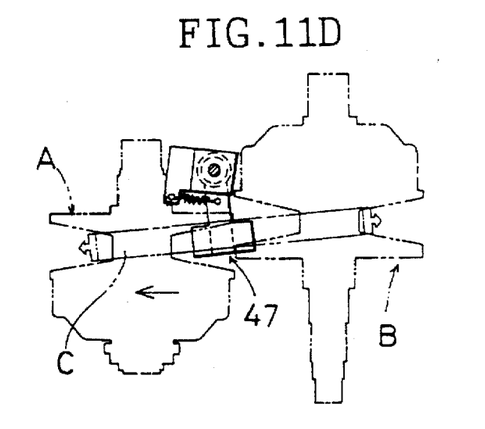

Thereafter, with the movement of the second holding member 22, the drive pulley A is moved backwards. As shown in FIG. 11D, the rear end of the belt C is inserted or placed into the groove of the drive pulley A. Then, the widening of the groove widths of both the pulleys A, B is released, the pinching devices 47, 47 are opened, the second movable frame 42 is lifted and, with the movement of the second holding member 22, the drive pulley A is lifted until its groove becomes the same in level with that of the driven pulley B, thus completing the assembling work of the belt C.

As can be seen from the above explanations, according to the present invention, the belt can be automatically assembled into a pair of pulleys that have been assembled in advance. The workability can therefore be improved.

It is readily apparent that the above-described apparatus for assembling a belt of a variator meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for assembling an endless belt of a variator, wherein the belt is automatically assembled into a pair of pulleys containing sheave halves forming a groove, said pulleys being held by a pulley holding unit having a pair of holding members for holding the pulleys such that axial lines thereof are parallel to each other, and means for relatively moving said holding members such that a sheave half of each of the pulleys is brought into a groove of the other of the pulleys, said apparatus comprising:
    a belt feeding unit for feeding the belt to an operative position with respect to said pulleys; and
    a belt assembly head operative to pinch intermediate portions of the endless belt to be fed from said belt feeding unit and to extend the belt across the pair of pulleys, said belt assembly head comprising belt pinching means effective to engage the endless belt at opposed intermediate portions thereof, and means for moving said belt pinching means such that one end and the other end of the endless belt are sequentially expanded for assembly into one and then the other of the pair of pulleys which are held in a condition in which the sheave half of each of the pulleys is brought into the groove of the other of the pulleys.

2. An apparatus for assembling a belt of a variator, wherein the belt is automatically assembled into a pair of pulleys held by a pulley holding unit having a pair of holding members for holding the pulleys such that axial lines of the pulleys become parallel to each other, and means for relatively moving said holding members such that a sheave half of each of the pulleys is brought into a groove of the other of the pulleys, said apparatus comprising:
    a belt feeding unit for feeding the belt; and
    a belt assembly head for pinching the belt to be fed from said belt feeding unit and extending the belt across the pair of pulleys, said belt assembly head comprising belt pinching means, and movement means for moving said belt pinching means such that one end and the other end of the belt are sequentially assembled into one and the other of the pair of pulleys which are held in a condition in which the sheave half of each of the pulleys is brought into the groove of the other of the pulleys, wherein said belt feeding unit comprises lifting means for lifting belts kept in a stacked condition, and serving means for serving and holding an uppermost belt.

3. An apparatus for assembling a belt of a variator, wherein the belt is automatically assembled into a pair of pulleys held by a pulley holding unit having a pair of holding members for holding the pulleys such that axial lines of the pulleys become parallel to each other, and means for relatively moving said holding members such that a sheave half of each of the pulleys is brought into a groove of the other of the pulleys, said apparatus comprising:
    a belt feeding unit for feeding the belt; and
    a belt assembly head for pinching the belt to be fed from said belt feeding unit and extending the belt across the pair of pulleys, said belt assembly head comprising belt pinching means, and movement means for moving said belt pinching means such that one end and the other end of the belt are sequentially assembled into one and the other of the pair of pulleys which are held in a condition in which the sheave half of each of the pulleys is brought into the groove of the other of the pulleys, wherein said belt pinching means comprises:
    a pair of pinching devices for pinching an intermediate portion of one side of the belt and an intermediate portion of the other side of the belt; and wherein said movement means comprises:
    parallel-movement means for parallelly moving said both pinching devices at least in two directions of an axial direction of the pulleys and a direction perpendicular to both axial lines of the pair of pulleys;
    tilting means for tilting both said pinching devices about an axis which is in parallel with a direction in which said both pinching devices lie opposite to each other; and
    rotating means for respectively rotating said both pinching devices about an axis which is in parallel with an axial line of the pulleys to thereby bend the belt such that a distance between one side and the other side of the belt becomes narrower towards one end portion thereof.

4. An apparatus for assembling a belt of a variator according to claim 3, wherein said rotating means is also rotatable in a direction to bend the belt such that a distance between one side and the other side of the belt becomes narrower towards the other end portion thereof.

5. An apparatus for assembling a belt of a variator according to claim 4, further comprising:
    a movable frame which constitutes said parallel-movement means and which parallelly moves in the axial direction of the pulleys and in the direction perpendicular to both axial lines of the pair of pulleys; and
    a head frame on which both said pinching devices are rotatably mounted via said rotating means;
    wherein said head frame is pivotally mounted on said movable frame in a tiltable manner via a pivot axis which is parallel with the direction in which both said pinching devices lie opposite to each other, said head frame constituting said tilting means.

6. An apparatus for assembling a belt of a variator according to claim 5, wherein said head frame is tiltable to one direction such that a posture of the belt pinched by both said pinching devices becomes a tilted posture in which one end portion of the belt approaches one of the pulleys into which the belt is first assembled, and wherein both said pinching devices are tiltable relative to said head frame against urging means in a direction which is opposite to the tilting direction of both said pinching members by the tilting to said one direction of said head frame.

7. An apparatus for assembling a belt of a variator according to claim 3, further comprising:
    a movable frame which constitutes said parallel-movement means and which parallelly moves in the axial direction of the pulleys and in the direction perpendicular to both axial lines of the pair of pulleys; and a head frame on which both said pinching devices are rotatably mounted via said rotating means;

wherein said head frame is pivotally mounted on said movable frame in a tiltable manner via a pivot axis which is parallel with the direction in which both said pinching devices lie opposite to each other, said head frame constituting said tilting means.

8. An apparatus for assembling a belt of a variator according to claim 7, wherein said head frame is tiltable to one direction such that a posture of the belt pinched by both said pinching devices becomes a tilted posture in which one end portion of the belt approaches one of the pulleys into which the belt is first assembled, and wherein both said pinching devices are tiltable relative to said head frame against urging means in a direction which is opposite to the tilting direction of both said pinching members by the tilting to said one direction of said head frame.

9. An apparatus for assembling a belt of a variator according to any one of claims 3–8, wherein each of said pinching devices comprises an inner pinching piece which abuts an inner side surface of the belt, and an outer pinching piece which abuts an outer side surface of the belt, and wherein a length, in a longitudinal direction of the belt, of said outer pinching piece is longer than that of said inner pinching piece.

* * * * *